K. LAUER.
MEASURING INSTRUMENT.
APPLICATION FILED FEB. 14, 1921.

1,405,926.

Patented Feb. 7, 1922.

Inventor
Karl Lauer
By Knight Bros
Attys

UNITED STATES PATENT OFFICE.

KARL LAUER, OF ESSEN, GERMANY, ASSIGNOR TO FRIED. KRUPP AKTIENGESELLSCHAFT, OF ESSEN-ON-THE-RUHR, GERMANY.

MEASURING INSTRUMENT.

1,405,926. Specification of Letters Patent. Patented Feb. 7, 1922.

Application filed February 14, 1921. Serial No. 444,982.

*To all whom it may concern:*

Be it known that I, KARL LAUER, residing at Essen, Germany, a citizen of the German Republic, have invented a certain new and useful Improvement in Measuring Instruments, (for which I have filed an application in Germany Dec. 5, 1919,) of which the following is a specification.

This invention relates to measuring instruments of the kind having a lever mounted on knife edges by aid of notches, and in the case of which the notches are formed by a thin strip of sheet metal protruding beyond the multi-part lever body. More particularly, it is an object of the invention to produce a measuring instrument of the type specified in the case of which the distance of the base-lines of the notches may be altered by simple means within the required limits.

One embodiment of the subject matter of the invention is shown by way of example in the annexed drawing which shows a caliper gauge constructed according to the invention.

Figure 1:
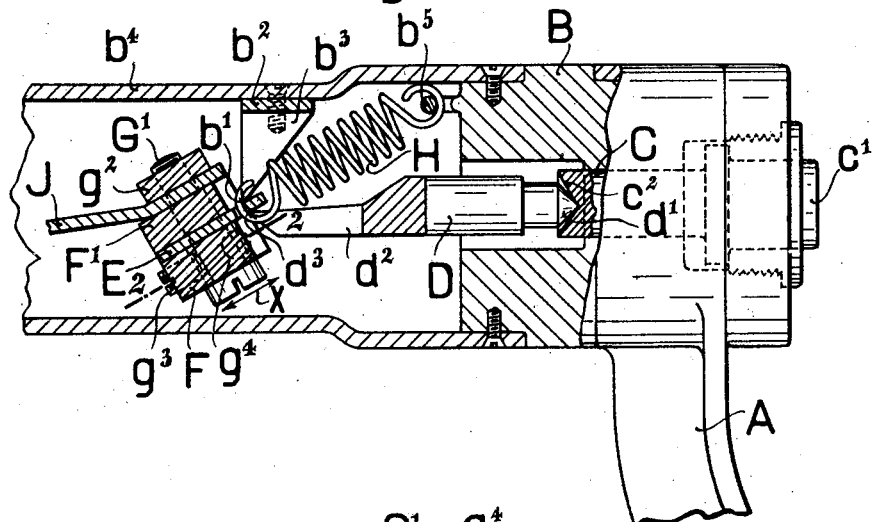
Figure 2:
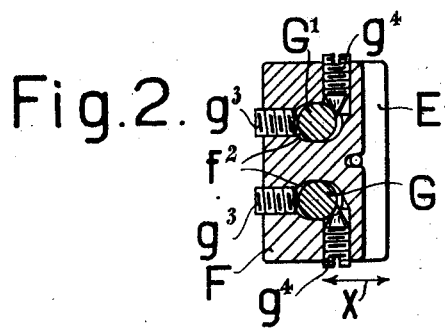
Figure 3:
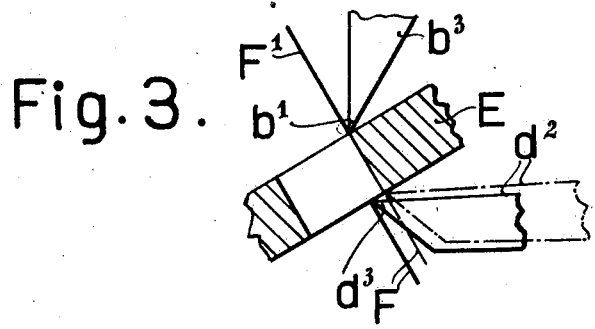

Fig. 1 shows a longitudinal mid-section of the caliper gauge, some parts being broken away, Fig. 2 shows a sectional view on line 2—2 in Fig. 1, looking from below, and Fig. 3 shows on a much enlarged scale a detail of Fig. 1.

Referring to the drawing, the one extremity of the semi-circular frame A of the caliper gauge carries a substantially cylindrical body B within which the movable gauging bolt C is displaceably mounted. The gauging bolt C is provided at one end with a gauging surface $c^1$ and at the other end with a conical recess $c^2$ into which a bolt D provided with a conical point $d^1$ is adapted to extend. At its opposite end the bolt D terminates in a two-pronged fork, the prongs $d^2$ of which are provided at their respective extremities each with a knife edge $d^3$. These two knife edges $d^3$, of which only one is shown in the drawing, are disposed along a straight line. At a very small distance from the said knife edges $d^3$ but parallel thereto, are arranged two additional knife edges $b^1$, which are likewise disposed along a straight line and which appertain to a socket $b^2$ having two wedge-shaped elements $b^3$. In the drawing there is only shown one of said wedge-shaped elements $b^3$ and one of the knife edges $b^1$. The socket $b^2$ is fixed by screws to the internal wall of a hollow cylindrical body $b^4$, for its part rigidly connected to the body B. This body $b^4$ carries at its end (not shown) the graduated scale of the measuring instrument. Into the gap formed between the knife edges $d^3$ and $b^1$ there projects a thin level strip of sheet metal E. The portion of this strip which projects beyond said gap is embraced by two elements F and $F^1$ which together form a block and are secured to one another by means of two bolts G and $G^1$ and nuts $g^2$. The bores receiving these bolts G and $G^1$ are shaped in the case of the one element, F, so as to constitute slots $f^2$ and this to allow of a displacement of this element relatively to the bolts G and $G^1$ and therewith to the strip E and the other element $F^1$ in the direction indicated by the double arrow $x$ (see Fig. 2). Four set screws $g^3$ and $g^4$ serve to displace and fix the element F relatively to the parts G $G^1$, E $F^1$ of the block; said set screws being arranged in the manner shown more in detail in Fig. 2, and of which the set screws $g^4$ are each adapted to bear up with the surface of their conical points against the bolts G, $G^1$. To the sheet metal strip E there is attached one end of a tension spring H, the opposite end of which engages a link $b^5$ fixed to the body B. By means of this tension spring H, the block is forced along with its notches formed by the projecting portion of the sheet metal strip E, against the knife edges $b^1$, $b^3$, the entire block being thereby kept suspended in the manner disclosed in particular in Fig. 1. To the block there is fixed an index J, the point of which is adapted to move across the graduated scale previously mentioned.

After the hereinbefore-described gauge has been primarily assembled, it is ascertained whether to a displacement of the gauging bolt, C, say, for example, for 1/1000 mm., will exactly correspond a deflection of the point of the index J on the graduated scale, for the space of a division representing 1/1000 mm. Should this not be the case, that is to say, in case the deflection of the point of the index be either too big or too small, then, after loosening the nuts $g^2$ of the bolts G and $G^1$, the element F is shifted by aid of the set screws $g^3$ and $g^4$ in the one or the other direction indicated by the double arrow $x$ relatively to the parts G G¹, E F¹. By such a displacement of the element F, the distance between the baselines of the notches formed by the portion of the sheet metal strip E projecting beyond the block F F¹ is either increased or diminished. However, this increase or reduction of the gap between the notches causes a corresponding increase or reduction of the deflection of the point of the index, since the said deflection may be considered with regard to the gauging range here entering into consideration, as the linear function of the gap between the notches.

The main advantage of the subject matter of the invention resides in the fact that it henceforth obviates the necessity of grinding the sheet metal strip E, which in and for itself is already extremely suitable for the formation of notches, down to an accurate dimension and absolutely true; so that as a result the manufacture of this particularly advantageous type of measuring instruments is substantially cheapened without, however, in the least impairing the accuracy of its measuring capacity.

Claims.

1. A block for measuring instruments comprising a strip and two elements one on each side of said strip, and means for adjusting one of said elements independently of the other element.

2. A block for measuring instruments comprising a strip and two elements one on each side of said strip, and abutting threaded means for adjusting one of said elements independently of the other element.

3. In combination a needle, a block attached to said needle having two knife resting edges on the same side of said block with respect to said needle a fixed knife engaging means for one of said edges and a movable knife engaging means for the other of said edges, and a spring tensioning device urging the block toward each of said knife means in the same direction.

4. In combination a needle, a block attached to said needle having two knife resting edges on the same side of said block with respect to said needle and fixed knife engaging means for one of said edges, and a movable knife engaging means for the other of said edges, and a spring tensioning device urging the block toward each of said knife means in the same direction and means for adjusting the relative distance between the two edges on said block.

5. In combination a needle, a block attached to said needle having two knife resting edges on the same side of said block with respect to said needle a fixed knife engaging means for one of said edges, and a movable knife engaging means for the other of said edges, and a spring tensioning device urging the block toward each of said knife means in the same direction and threaded means for finely adjusting the relative distance between the two edges on said block.

6. In combination a needle, a block attached to said needle having two knife resting edges on the same side of said block with respect to said needle a fixed knife engaging means for one of said edges, and a movable knife engaging means for the other of said edges, and a spring tensioning device between said two knife resting edges urging the block toward each of said knife means in the same direction.

7. A block for measuring instruments comprising a strip and two elements one on each side of said strip, and abutting threaded means for adjusting one of said elements independently of the other element, said elements being slotted, and a bolt passing through said strip and said elements, said threaded means independently mounted on said elements and engaging said bolt.

The foregoing specification signed at Essen, Germany, this 3rd day of November, 1920.

KARL LAUER.

In presence of—
HANS GOTTSMANN,
JOHANN DECKERS.